(12) United States Patent
Enbom

(10) Patent No.: US 9,067,158 B2
(45) Date of Patent: Jun. 30, 2015

(54) FILTER UNIT

(75) Inventor: Ernst Kjell-Ake Enbom, Trosa (SE)

(73) Assignee: CAMFIL AB, Trosa (SE)

(*) Notice: Subject to any disclaimer, the term of this patent is extended or adjusted under 35 U.S.C. 154(b) by 0 days.

(21) Appl. No.: 13/520,084

(22) PCT Filed: Jan. 19, 2010

(86) PCT No.: PCT/EP2010/050590
§ 371 (c)(1),
(2), (4) Date: Jun. 29, 2012

(87) PCT Pub. No.: WO2011/088890
PCT Pub. Date: Jul. 28, 2011

(65) Prior Publication Data
US 2012/0324848 A1    Dec. 27, 2012

(51) Int. Cl.
*B01D 19/00*    (2006.01)
*B01D 46/00*    (2006.01)
*B01D 46/52*    (2006.01)

(52) U.S. Cl.
CPC ........ *B01D 46/0002* (2013.01); *B01D 46/0001* (2013.01); *B01D 46/521* (2013.01); *B01D 2271/02* (2013.01)

(58) Field of Classification Search
CPC ........ B01D 46/02; B01D 46/10; B01D 46/12; B01D 46/521; B01D 46/523
USPC .................................. 55/483, 487, 497, 502
See application file for complete search history.

(56) References Cited

U.S. PATENT DOCUMENTS

| | | | |
|---|---|---|---|
| 6,228,152 B1 | 5/2001 | Guerin et al. | |
| 6,406,509 B1 * | 6/2002 | Duffy | 55/492 |
| 2006/0261002 A1 | 11/2006 | Dworatzek et al. | |
| 2007/0289273 A1 * | 12/2007 | Boyd | 55/497 |
| 2009/0126326 A1 * | 5/2009 | McClellan | 55/497 |

FOREIGN PATENT DOCUMENTS

| | | |
|---|---|---|
| DE | 20-2005-008092 U1 | 9/2006 |
| DE | 102007016161 A | 10/2008 |
| GB | 1334002 | 10/1973 |
| JP | 09-187610 A | 7/1997 |
| JP | 09187610 * | 7/1997 |
| JP | H11-90150 | 4/1999 |

OTHER PUBLICATIONS

International Preliminary Report on Patentability dated Aug. 2, 2012 issued in International Application No. PCT/EP2010/050590.
(Continued)

*Primary Examiner* — Robert Clemente
*Assistant Examiner* — Karla Hawkins
(74) *Attorney, Agent, or Firm* — Harness, Dickey & Pierce, P.L.C.

(57) ABSTRACT

A filter unit for removing particles from an air or gas flow, comprising a filter body having a front side, a rear side, and an edge side between the front side and the rear side, and an edge strip arranged on the edge side, which edge strip extends at least the height of the edge side and at least the length of the edge side, wherein the edge strip comprises a foamed thermoplastic material, which is molded to the edge side of the filter body such that the edge strip thereby is formed and fastened directly to the edge side of the filter body, and such that the edge is embedded in the edge strip.

12 Claims, 5 Drawing Sheets

(56) References Cited

OTHER PUBLICATIONS

European Office Action dated Nov. 4, 2013 issued in corresponding European Application No. 10701654.5.

Office Action issued in corresponding Chinese Application No. 201080061876.7.

International Search Report PCT/ISA/210.

* cited by examiner

FILTER UNIT

FIELD OF THE INVENTION

The present invention relates to the stabilization of filters for removal of particles from an air or gas flow.

BACKGROUND OF THE INVENTION

Filters are often used to remove solid particles such as e.g. dust, pollen, mold, or sand from an air or gas flow. Especially in applications where air quality is important, filters are often indispensible for the provision of clean air. As an example, gas turbines are generally operated with one or more filters such that particles are hindered to enter the turbine, thereby increasing the service life of the machinery. Furthermore, other applications and environments such as clean rooms, building ventilation systems, vacuum cleaners, engines, and so on, are often dependent on the supply of clean air by means of filters.

Many filters are characterized by that they have one or more filtering layers, made of paper or other similar fabrics, that are pleated shaped. By the pleats, the filter increases its effective area such that a more efficient filtering is provided, the air penetrating the filter from an upstream side to a downstream side of the filter medium.

For the support of a pleated filter medium, or any similar filter of its kind, a frame structure may be provided around the filter. A frame structure may offer a more stable construction for the filter such that the filter may better withstand deformations occurring from e.g. mechanical strain and/or air pressures through the filter during operation. Furthermore, frame structures often simplify filter mounting procedures, e.g. mounting of filters in air channels. The frames may provide a support for the filters in the mounting procedure and hinder filter deformations and damages at the filter edges. Moreover, the frame structures may be formed to provide an improved fit in the air channels, further facilitating the mounting of the filters.

The support of a filter by means of a frame structure applied to the filter edge is a solution frequently used in filter manufacturing. However, the frame structures often cannot provide an adequate sealing of the filters at the filter edges. As a consequence, this may lead to unwanted filter leakage at the edges, whereby the filter performance is deteriorated.

SUMMARY OF THE INVENTION

It is an object of the present invention to provide a filter unit that at least mitigates at least some of the above problems.

This and other objects are achieved by providing a filter unit having the features defined in the independent claim. Preferred embodiments are defined in the dependent claims.

According to the present invention, there is provided a filter unit for removing particles from an air or gas flow, comprising a filter body having a front side, a rear side, and an edge side between the front side and the rear side, and an edge strip arranged on the edge side, which edge strip extends at least the height of the edge side and at least the length of the edge side, for providing the edge side with a mounting support, wherein the edge strip comprises a foamed thermoplastic material, which is molded to the edge side of the filter body such that the edge strip thereby is formed and fastened directly to the edge side of the filter body, and such that the edge side is embedded in the edge strip for providing the edge side with a sealing against air leakage.

Thus, the filter unit of the present invention is based on the idea of providing an improved filter unit by an edge strip comprising a foamed thermoplastic material. The hardness and the air-tight properties of the foamed thermoplastic material comprised in the edge strip provide a reinforcing sealing for the edge side of the filter unit.

The term "thermoplastic" should be construed as a plastic capable of softening or fusing when heated and hardening again when cooled.

Furthermore, the term "foamed thermoplastic" should, in this context, be construed as a thermoplastic comprising air and/or another gas, e.g. an inert gas such as nitrogen, such to form a consistent foamed thermoplastic. Thus, by foaming the thermoplastic, an expanded thermoplastic having gas pockets formed substantially throughout the medium is achieved.

By the term "filter body", it is meant the part of the filter unit which enables the filter unit to filtrate the incoming air or gas at operation, thereby removing solid particles such as e.g. dust, pollen, and/or mold.

The front side of the filter body means the "upstream" side of the filter body, i.e. the side of the filter body facing the incoming air or gas flow when the filter is in use. In other words, the front side of the filter is the side of the filter into which the unfiltered air of gas flows. Analogously, the back side of the filter means the "downstream" side of the filter body, i.e. the side of the filter body wherein the passing air or gas flow is filtered.

The edge side is provided between the front side and the back side of the filter body, at the periphery of the filter body. The edge strip is arranged on the edge side for supporting the edge side, i.e. that the strip counteracts a deformation of the edge side.

By the wording "edge side", it is meant that the filter may have one or more edge sides, dependent on its form. For example, a round filter has only one edge side, whereas a rectangular or quadratic filter has four.

The edge strip extends at least the height of the edge side and at least the length of the edge side, which means that the edge strip is at least as high as the edge side and at least as long as the edge side. By this, the edge strip reinforces the entire height and entire length of the edge side, thereby providing an improved support and sealing for the edge side. Furthermore, with an edge strip being at least as high and at least as long as the edge side, the edge strip better protects the filter body from damage.

Analogously, several combinations of edge strip heights may be feasible. As an example, the edge strip may be greater than the height of the filter at the front side, whereas the edge strip and the filter body may be provided in the same plane at the rear side. In other words, if the filter is seen in profile, the edge strip is flush with the edge side at the rear side and may project from the edge side at the front side. Furthermore, the edge strip and the filter body may be "shifted" such that the edge strip may be provided above or below the filter body both at the front side and the rear side. The various embodiments of different heights and/or shifts of the edge strips may be desirable when the need for filter reinforcement and/or sealing have certain demands on different designs on the filter unit.

The edge strip comprises a foamed thermoplastic material which is molded to the edge side of the filter body. In the molding process, the thermoplastic material is heated such that it becomes soft and pliable. Then, gas is dispersed into the thermoplastic material such that the thermoplastic material becomes foamed. As a result, the thermoplastic material becomes inflated, i.e. it increases its volume. When the foamed thermoplastic material has the wanted properties comprising factors such as e.g. temperature and amount of gas, the foamed thermoplastic material may be molded to the edge side of the filter.

The foamed thermoplastic material enables a continuous application of the edge strip to the edge side of the filter. By this, it is meant that the foamed thermoplastic material may be applied directly from the production of the foamed thermoplastic material to the filter. Thus, this process is different from the application of an edge strip wherein the edge strip has been cast. However, such a method, wherein the edge strip is cast upon the filter in a mould, may also be possible.

The molding may be customized for the filter requirements. As an example, the height and the thickness of the edge strip may be adjusted for the filter to which the foamed thermoplastic is applied. For example, the foamed thermoplastic can be supplied by a nozzle or nozzles, the adjustment may be done by selecting the positions or the width of the mouths of the nozzle or nozzles which supply the foamed thermoplastic to the filter.

Furthermore, the molding of the foamed thermoplastic material to the edge sides may be a continuous production of edge strips to the filter bodies. This yields an effective and fast process of the supply of filter units comprising edge strips for the reinforcing sealing of the filter bodies.

The foamed thermoplastic material provides an improved adhesion of the edge strip to the edge side compared to a molded thermoplastic not being foamed. The gas pockets formed in the heated foamed thermoplastic material keep the heat in the plastic cells such that the temperature decrease of the thermoplastic at molding is smaller than for a thermoplastic which is not foamed. In other words, the hardening of the foamed thermoplastic material is slower than the hardening for a non-foamed thermoplastic material. As a consequence, more time is available for the molding of the foamed thermoplastic material to the edge side of the filter body. This means that the foamed thermoplastic material in its warm, soft state, to a higher degree may improve the contact with the edge side such to hinder the occurrence of voids, bubbles, an uneven adhesion of the thermoplastic material to the edge side, or the like.

Based on the above observations, the foamed thermoplastic material of the edge strip provides a better sealing of the edge side to which it is molded compared to the application of a thermoplastic material not being foamed.

Furthermore, the foamed thermoplastic material provides the advantage of a uniform dimensional stability and uniform surface quality. The use of the foamed thermoplastic molding for mounting and holding fixtures is economically superior to conventional casting processes for these fixtures embodying e.g. epoxy resins with imbedded metal reinforcements, wherein the constituents are more expensive than the foamed thermoplastic material. The invention offers the advantage of using synthetic materials for the production of mounting and holding the filter unit, providing low impact sensitivity and high wear resistance because of the good thermoplastic material properties.

The foamed thermoplastic material molded to the edge side of the filter body provides an edge strip which is formed and fastened directly to the edge side of the filter body. With the wording "fastened directly", it is here meant that the use of any auxiliary adhesive such as glue or the like is superfluous, making the molding cheaper and easier. Furthermore, as the foamed thermoplastic material may be molded continuously to the edge side, the adhesive properties of the material ensure that the edge strip provides a reinforcing sealing of the edge side. This may be superior to other, more laborious ways of providing filter reinforcements or sealings, including e.g. separate castings of frames which are glued to the filters.

The edge strip is at least partially sunk into the edge side to embed the edge side, resulting in that the edge strip becomes tightly adhered to the edge side. An advantage of the foamed thermoplastic material of the edge strip embedding the edge side is that the edge strip provides an ameliorated sealing of the edge side. By this it is meant that the edge strip more efficiently hinders a filter leakage at the edge side when an air or gas flow flows from the front side to the back side of the filter body. The foamed thermoplastic material molded to the edge side provides a substantially air-tight sealing of the edge side, thereby improving the filter efficiency as air or gas flow flowing from the front side to the back side penetrates the filter medium instead of leaking at the edge sides.

Furthermore, the edge strip comprising a foamed thermoplastic material molded to the edge side of the filter body provides a firm support for the edge side. After the cooling of the warm thermoplastic material molded to the edge side, the thermoplastic hardens. By this, the edge strip provides the advantage of a rigid edge side support.

In the prior art, melt glue or the like is sometimes used for the sealing of the edge sides of a filter and separate prefabricated strips are often applied to the filters together with the melt glue for supporting the filter and for fixing the pleats of a pleated filter. However, according to the present invention, the edge strip formed from the foamed thermoplastic mitigates this complicated arrangement, and provides a filter sealing and support by a single strip. By the edge strip of foamed thermoplastic material, neither glue nor additional reinforcements are necessary to provide an edge strip that supports and seals the filter. The strengthening of the edge side by the foamed thermoplastic material provides the further advantage of a more rigid filter body, such that a deformation of the filter unit is hindered. This is highly advantageous considering that the service life of the filter unit may be prolonged, and that costly and or troublesome repairs of the filter unit may be circumvented. Therefore, the foamed thermoplastic material provides an improved reinforcing sealing of the edge sides of the filter compared to prior art.

The thermoplastic material may be polypropylene, polystyrene, acrynolitrile-butadiene-styrene, or the like.

Materials for the filter suited for the removal of particles from an air or gas flow whilst still being air or gas-permeable may be any of, or the combination of, e.g. glass fiber paper, non-woven fabric, or the like.

According to an embodiment of the present invention, the foamed thermoplastic material is molded to the edge side of the filter body, such that the edge strip forms a mounting frame for the filter body. By "mounting frame", it is here meant that the edge strip, partially or completely, encloses the filter body at the filter body edge side or sides.

The mounting frames may be provided around the filter bodies in many different thicknesses, heights, or the like, such that the filters may be customized for different working environments. As an example, thick edge strips forming a big, rigid frame may be wanted such that the filter may withstand harsh environments such as big air pressures during operation. As a further example, the frames may be made sufficiently stiff to be mounted into systems, wherein the demands for sustainability are high and/or the filters are difficult to replace.

Furthermore, the frames may be also be adjusted in size such to fit within module systems. This is wanted in cases where adjacent frames should fit tightly such as to minimize leakage between the filter bodies. Analogously, the frames may be formed such to fit within air channels, such that a mounting of the filters is facilitated.

According to an embodiment of the present invention, the thermoplastic material is molded to the edge side of the filter body, such that the edge strip in its cross-section is U-shaped. By the U-shape, the edge strip is molded to both the edge side and a portion of the front side and back side of the filter body circumferential at the edge side. An advantage with this embodiment is that an even more rigid edge strip is provided for the support of the filter unit. The U-shape of the edge strip further contributes to the sealing and the support of the filter unit at the edge side.

The variations of the U-shape of the edge strip may be numerous. As an example, the foamed thermoplastic material may be molded to a relatively small portion of the front side circumferential and the back side circumferential such that only a small portion of the front side and back side are covered by the foamed thermoplastic material, the edge strip however still providing a sufficient sealing and support for the filter body. By this, a higher degree of filter efficiency may be obtained. Alternatively, the foamed thermoplastic material may be molded to a relatively big portion of the front side and back side circumferentials such that a more rigid support of the filter unit is obtained. As another example, the foamed thermoplastic material may be molded to a bigger portion of the front side at the front side circumferential than the portion of the back side at the back side circumferential, or vice versa, in accordance with any preferred embodiment of the filter units.

According to an embodiment of the present invention, the filter body comprises a sheet which is pleated to form a plurality of parallelly folded pleats, the foamed thermoplastic material being molded to the edge side of the filter body, which edge side is zig-zag shaped. As an example, in case of a rectangular-shaped filter, the filter has two edge sides being zig-zag shaped.

By the term "sheet", it is meant the filter form which filtrates the incoming air or gas at operation, thereby removing solid particles such as e.g. dust, pollen, and/or mold.

By "pleated" it is here meant that the sheet comprises a plurality of parallelly folded pleats which each extend in a longitudinal direction of the filter body. In other words, the pleats provide a zig-zag pattern of the filter sheet. Alternatively, the filter sheet may be undulated, rugged, or the like such that the effective area of the filter sheet is increased compared to a plain sheet.

The foamed thermoplastic material, being molded to the zig-zag-shaped edge side of the sheet, embeds the pleated edge side. The foamed thermoplastic material is hardened between the pleats of the sheet such that an even stronger embedding of the edge side is provided. In other words, the pleated filter sheet provides a longer filter material edge per unit length of the edge side in the longitudinal direction, compared to an edge side not being pleated. This has the effect that upon molding of the foamed thermoplastic material, the thermoplastic may embed a longer edge side per unit length of the pleated filter sheet such that the bonding of the foamed thermoplastic material to the edge side becomes stronger.

As an example, the foamed thermoplastic material may embed the pleats such that the pleats penetrate approximately 50% of the thickness of the foamed thermoplastic material of the edge strip. By this penetration of the edge strip, the sealing of the filter at the edge side may be improved compared to embodiments wherein the edge strip has not penetrated the filter medium at all, or more shallowly, compared to the embodiment of this invention. In absolute terms, this depth of penetration may range from ½-4 mm.

According to an embodiment of the present invention, the foamed thermoplastic material is molded to the edge side of the filter body, which edge side is a portion of a pleat of the sheet. In the case of a rectangular filter unit, the foamed thermoplastic material is in other words molded to the edge side extending parallel to the pleats of the sheet.

As an example, the foamed thermoplastic material may be molded to any edge side of the pleated sheet of the filter body. This is advantageous when there is a wish to customize the filter units regarding demands for e.g. filter unit reinforcement/sealing, mounting properties, weight, etc.

According to an embodiment of the present invention, the filter body is rectangular, the foamed thermoplastic material being molded to the edge sides of the filter body, such that the edge strip forms a rectangular mounting frame for the filter body. By this frame, wherein the edge strip encloses the pleated sheet by the filter body edge sides, enclosing the rectangular filter body, the filter units may be more easily stored and transported with a decreased risk for filter unit damages.

Alternatively, the filter body may take on any other shape, wherein the foamed thermoplastic material is molded to the edge sides of the filter body. As an example, instead of the rectangular shape, the filter body may be circular, triangular, or polygonal. As another example, instead of a relatively flat filter body as mentioned in the previous examples, the filter body may be cylindrical or parallellepiped shaped. In these examples, the edge sides are provided at the top and the bottom of the shapes, such that an edge strip molded to an edge side may be seen as a top and/or bottom "lid".

According to an embodiment of the present invention, the rectangular mounting frame in its cross-section is U-shaped. By the U-shape, the edge strip is molded to both the edge side and a portion of the front side and back side of the pleated filter body circumferential at the edge side. An advantage with this embodiment is that an even more rigid edge strip is provided for the support of the filter unit with the pleated filter sheet. The U-shape of the edge strip further contributes to the sealing of the filter unit at the pleated edge side.

The edge strip arranged on the edge side of the filter may consist of a foamed thermoplastic material only. Thus, the edge strip may consist of the thermoplastic material and the gas provided to foam the thermoplastic material.

According to an embodiment of the present invention, the thermoplastic material is polypropylene, polystyrene, acrynolitrile-butadiene-styrene, or the like. Polypropylene has the advantage that it is stable with respect to temperature, wear resistant, and has a very high resistance to fracture. However, it could also be possible to use polyvinyl chloride or polystyrol for the thermoplastic material molding.

According to an embodiment of the present invention, the gas comprised in the foamed thermoplastic is air, nitrogen, or the like. These gases provide the advantages of providing the sought properties of the foamed thermoplastic. Furthermore, the gases are easily accessible and cheap.

According to an embodiment of the present invention, the amount of gas comprised in the thermoplastic material is at least 40% (by volume). By this, it is meant that the amount of gas dispersed in the thermoplastic such that the thermoplastic becomes foamed, is at least 40% (by volume).

This amount of gas is sufficiently high such that the thermoplastic material is non-thixotropic at molding, i.e. that the thermoplastic material is in a non-dripping state. This greatly facilitates the molding procedure, and reduces the risk of deformed edge strips after the thermoplastic material has hardened.

Furthermore, the amount of gas is sufficiently high such to avoid a foamed thermoplastic material being too heavy, as the density of the thermoplastic is higher than the density of the gas. A lighter filter unit is advantageous considering e.g. filter unit transports and mounting.

Furthermore, the amount of gas is sufficiently high such that the edge strip comprising the foamed thermoplastic material ensures a satisfactory support for the edge side. In other words, if the foamed thermoplastic comprises too little gas, the edge strip may become too soft, thereby not providing the required support for the edge side.

Another advantage of having an amount of gas being sufficiently high in the foamed thermoplastic material is that the gas pockets formed by the gas in the foamed thermoplastic, keeping the heat in the thermoplastic cells, further prevents a too big temperature decrease of the thermoplastic at molding. Thus, the molding of the edge strip comprising the thermoplastic molding becomes easier, as the edge strip does not cool as fast as a foamed thermoplastic material with less amount of gas.

Furthermore, by providing at least the amount of gas in the foamed thermoplastic material, the foamed thermoplastic becomes cheaper compared to a foamed thermoplastic with a higher concentration of thermoplastic.

Another advantage of having an amount of gas being sufficiently high in the foamed thermoplastic material is that the foamed thermoplastic not becomes too thin, as the insertion of gas thickens the thermoplastic. An edge strip comprising a sufficiently thick foamed thermoplastic provides an improved support for the edge side. Moreover, a sufficiently thick foamed thermoplastic material diminishes the risk of edge strip air leakage at the edge side at operation of the filter unit. Furthermore, a sufficiently thick foamed thermoplastic material avoids a situation where the edge side penetrates the foamed thermoplastic material, which could lead to an inferior support of the edge side.

According to an embodiment of the present invention, the amount of gas comprised in the thermoplastic material is not more than 80% (by volume). By this, it is meant that the amount of gas dispersed in the thermoplastic such that the thermoplastic becomes foamed, is not more than 80% (by volume).

The amount of gas is sufficiently low such that the thermoplastic provides a sufficient contact with the edge side. By this it is meant that a too high concentration of gas may lead to the unwanted effect of a release of the molded edge strip from the edge side, as the foamed thermoplastic material not provides a sufficient adhesion of the foamed thermoplastic to the edge side.

Furthermore, the amount of gas in the interval is sufficiently low such that the edge strip comprising the foamed thermoplastic material ensures a satisfactory support for the edge side. In other words, if the foamed thermoplastic comprises too little thermoplastic material compared to the gas inserted in to it, the edge strip may become too soft, thereby not providing the required support for the edge side. Moreover, a foamed thermoplastic with a too high concentration of gas increases the risk of edge strip leakage at the edge side at operation of the filter unit.

By the amount of gas comprised in the thermoplastic material being at least 40% (by volume) and not more than 80% (by volume), the foamed thermoplastic material diminishes the risk of not providing an edge strip that fulfills the demands in terms of e.g. sealing and support properties, as mentioned above.

According to an embodiment of the present invention, the amount of gas comprised in the thermoplastic is at least 50% (by volume). This amount even further optimizes the properties of the foamed thermoplastic, as the range provides the benefits of having a sufficient amount of gas such that the foamed thermoplastic is e.g. non-thixotropic, light, heat conserving, cheap, thick, and so on.

According to an embodiment of the present invention, the amount of gas comprised in the thermoplastic is not more than 70% (by volume). This amount provides the advantages of having a sufficient amount of thermoplastic, such that the foamed thermoplastic is e.g. easily molded, provides sufficient support and sealing, and so on.

By the amount of gas comprised in the thermoplastic material being at least 50% (by volume) and not more than 70% (by volume), the limits provide an optimal functioning for the foamed thermoplastic in terms of e.g. sealing and support properties, as mentioned above.

According to an embodiment of the present invention, the filter arrangement comprises at least two filter units provided side-by-side, and the foamed thermoplastic material is molded to oppositely arranged edge sides such that the edge strips form a mounting frame shaped as a grid for the filter units. By this, it is meant that the filter units are provided adjacent each other, either in a row or as a matrix, and that the foamed thermoplastic material is provided between the adjacent filter units. Any kind of filter unit sizes and shapes are feasible to be comprised in this embodiment.

The foamed thermoplastic material molded to oppositely arranged edge sides of the arrangement of filter units provides the advantage of a more stable arrangement when providing a plurality of filter units.

According to an embodiment of the present invention, the foamed thermoplastic is molded to the edge sides between two adjacently provided filter units such that the two filter units are obliquely arranged at an angle. This embodiment means that the plurality of filter units are provided in an accordion-like way, i.e. that there is a fixed angle between every two filter units of the plurality of filter units of the filter arrangement.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION

In the following description, the present invention is described with reference to a filter unit for removing particles from an air or gas flow. This description is intended for the purpose of explanation only, and is not to be taken in a limiting sense.

Figure 1:
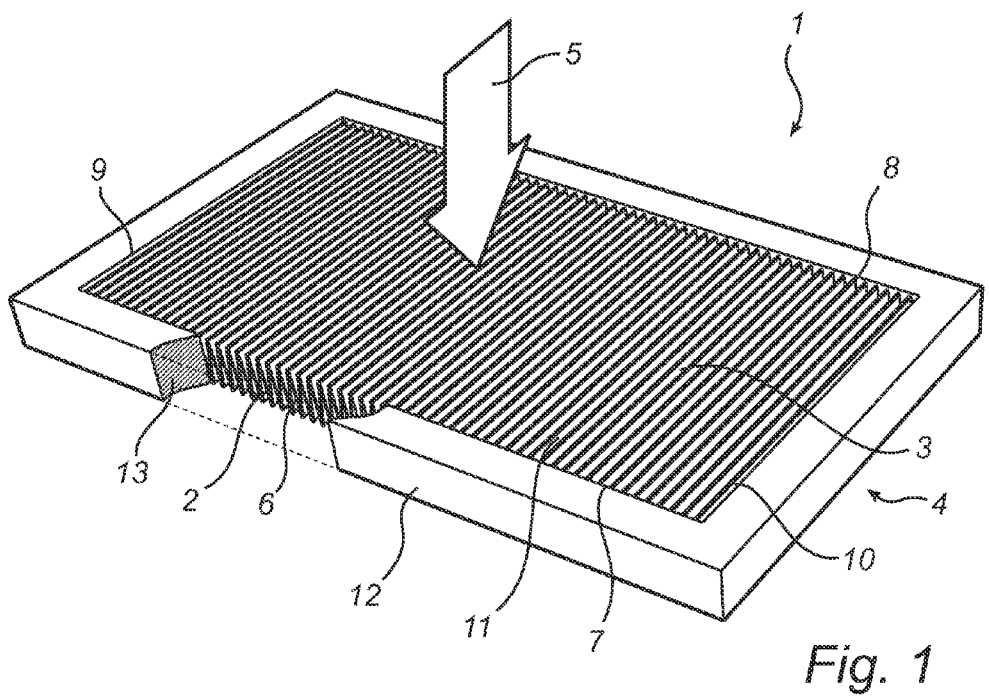
FIGS. 1-3 are perspective views of the filter unit according to embodiments of the invention.

In FIG. 1, the filter unit 1 of the present invention is shown. The filter unit 1 comprises a rectangular shaped filter body 2 having a front side 3 and an oppositely arranged back side 4

(not shown). The front side 3 and the back side 4 are provided perpendicular to an air or gas flow 5 when the filter unit is in use. The flow 5 enters the filter body 2 at the front side 3, flows through the filter body 2, and exits the filter body 2 at the back side 4. Thus, during operation, the unfiltered air or gas flow 5 enters the front side 3 and the filtered air or gas flow 5 exits the back side 4.

An edge side 6 of the filter body 2 is formed between the front side 3 and the back side 4. The edge side 6 comprises the oppositely arranged sides 7 and 8 and the oppositely arranged sides 9 and 10, perpendicular to the sides 7 and 8.

The filter body 2 comprises a sheet which has a plurality of parallelly folded pleats 11 which each extend in a longitudinal direction perpendicular to the air or gas flow 5. The folded pleats 11 extend from a side 7 of the rectangular-shaped filter body 2 to an oppositely arranged side 8. In other words, the folded pleats 6 extend parallel to the two oppositely arranged sides 9 and 10, and perpendicular to the sides 7 and 8. The filter sheet is in this embodiment is composed of a filtering material such as paper, non-woven fabric, or a combination thereof.

The folded pleats 11 form a pattern with peaks and valleys. At the sides 7 and 8 of the filter body 2, the edge side 6 has a zig-zag pattern. At the edge sides 9 and 10, in a direction perpendicular to the sides 7 and 8, the edge sides 6 extend along the pleats of the filter unit 1.

Although the filter unit 1 has a rectangular shape, the filter unit 1 may, in other not shown embodiments, take on any other shape such as quadratic, round, triangular, polygonal, or the like.

An edge strip 12 is arranged on the sides 7-10 for supporting the filter unit 1. The edge strip 12 comprises a foamed thermoplastic material 13 which is molded to the sides 7-10. The foamed thermoplastic material 13 is thereby formed and fastened directly to the edge side 6 of the filter body such that the edge side 6 is embedded in the edge strip 12. The edge strip 12 thereby forms a frame around the edge sides 7-10 to provide a reinforcing sealing for the filter unit 1.

The edge strip 12 extends in parallel with the edge sides 7-10 at least the entire length thereof, such that the filter body 2 is enclosed by the edge strip 12. Furthermore, the height of the edge strip 12 is greater than the height of the edge sides 7-10, i.e. the edge strip 12 embeds the entire heights of the sides 7-10.

The edge strip 12 consists of a foamed thermoplastic material. The thermoplastic material may be polypropylene, polystyrene, acrynolitrile-butadiene-styrene, or the like, whereas the gas comprised in the foamed thermoplastic may be air, nitrogen, or the like. The amount of gas comprised in the thermoplastic material is at least 50% (by volume) and not more than 70% (by volume).

Figure 2:
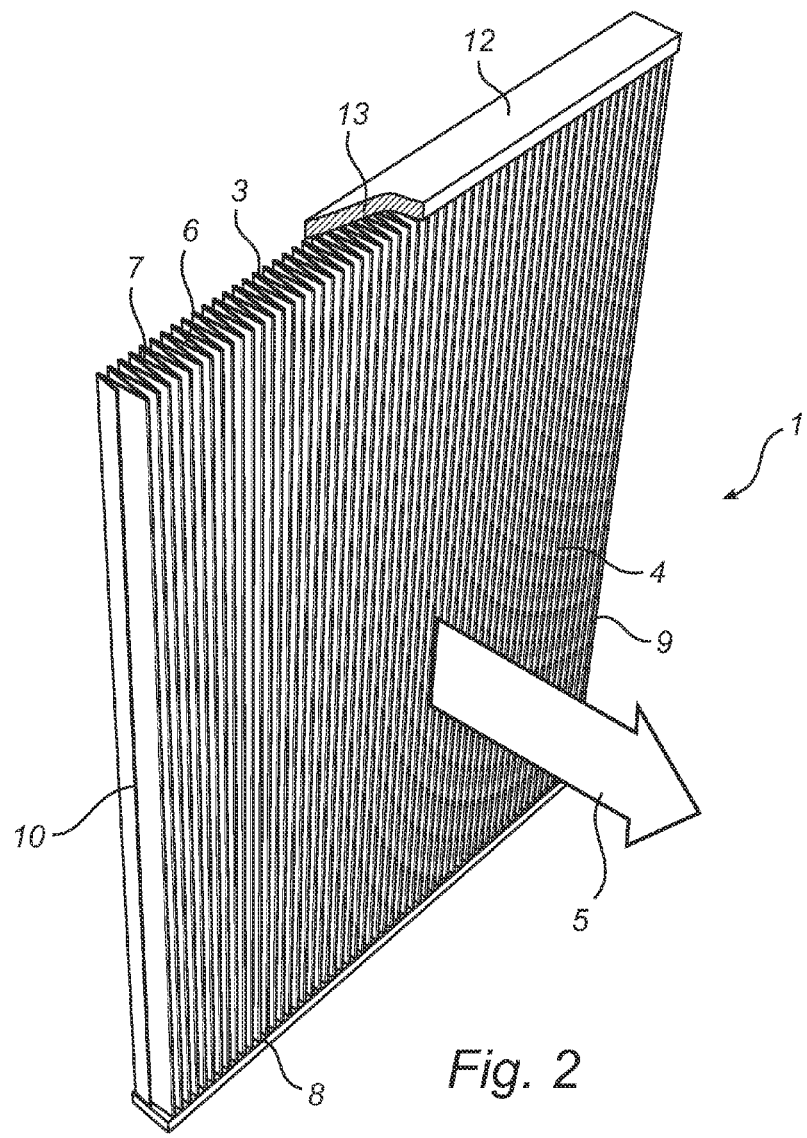

In FIG. 2, the filter unit 1 is shown in a perspective view. The zig-zag pattern of the edge side 6 is shown with the peaks and the valleys of the pattern extending in the direction of the air or gas flow 5. The foamed thermoplastic material 13 of the edge strip 12 embeds the edge side 6, i.e. the foamed thermoplastic material 13 surrounds and wraps the edge side 6. The height of the foamed thermoplastic material 13 embedding the edge side 6 is greater than the height of the pleat edge 6 such that the foamed thermoplastic material 13 exceeds both the peaks of the front side 3 and the valleys of the back side 4. Although FIG. 2 shows the embodiment wherein edge strip 12 is molded only to the pleated edge sides 6, the edge strip 12 may be molded to all edge sides 7-10 of the filter unit 1.

Figure 3:
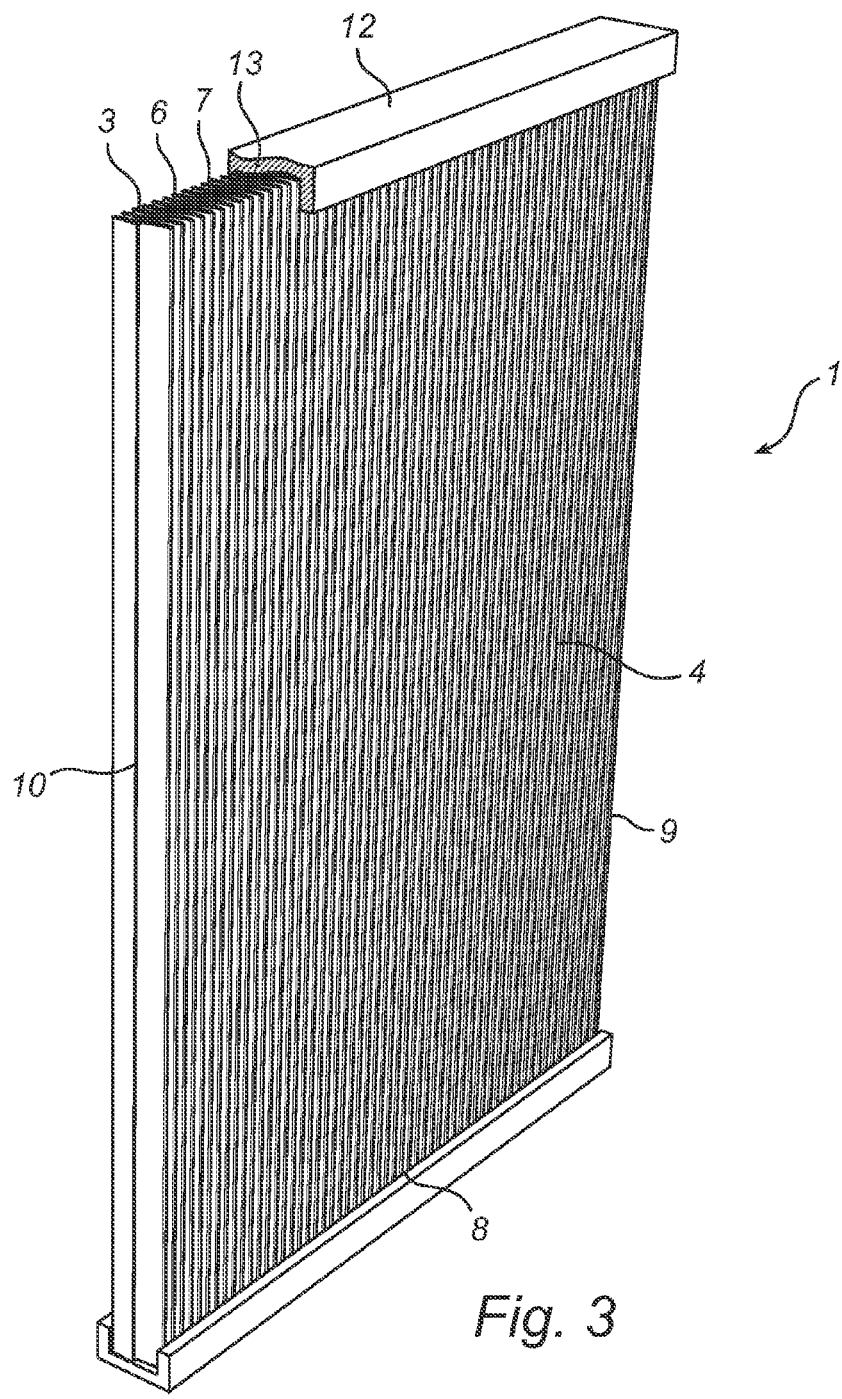

In FIG. 3, the filter unit 1 is shown in a perspective view. The foamed thermoplastic material 13 of the edge strip 12 embeds the edge side 6 as a U-shape, i.e. that the edge strip 12 is molded both to the pleated edge sides 6 and to a portion of the front side 3 and the back side 4. Although FIG. 3 shows the embodiment wherein the U-shaped edge strip 12 is molded only at the pleated edge sides 6, the edge strip 12 may be molded to all edge sides 7-10 of the filter unit 1.

Figure 4:
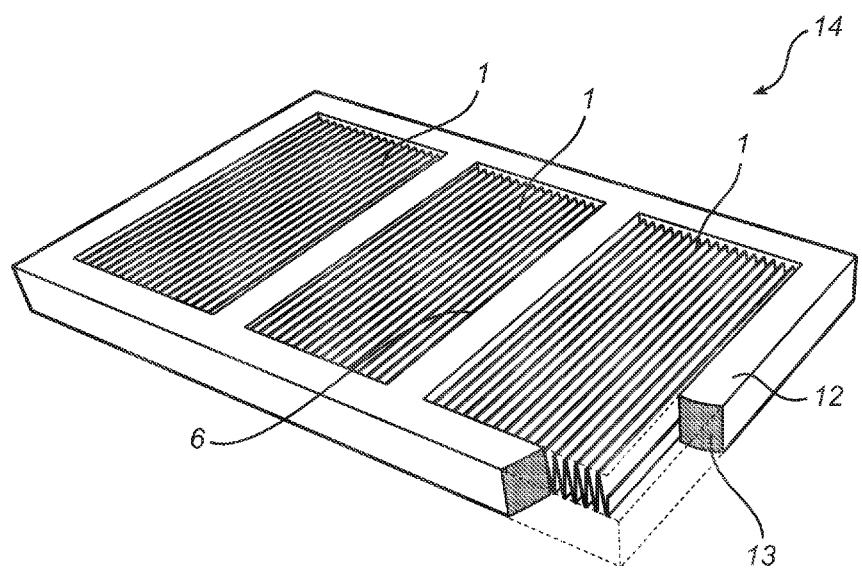
FIG. 4-5 are perspective views of arrangements of filter units according to embodiments of the invention.

In FIG. 4, a filter arrangement 14 comprising three filter units 1 is shown. The three filter units 1 are provided side-by-side, and the foamed thermoplastic material 13 is molded to oppositely arranged edge sides 6 such that the edge strip 12 forms a mounting frame shaped as a grid for the filter units 1.

Figure 5:
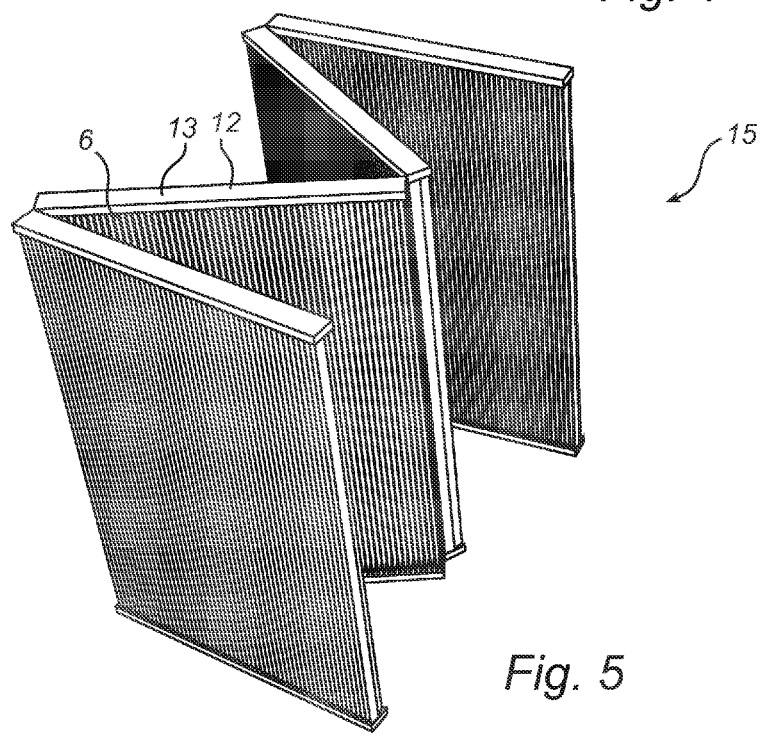

In FIG. 5, a filter arrangement 15 comprising four filter units 1a is shown, wherein the foamed thermoplastic material 13 of the edge strip 12 is molded to the pleated edge sides 6 of the filter units 1. Further, the foamed thermoplastic material 13 is molded to the edge sides 6 such that the filter units 1 are provided in angles, i.e. that the filter arrangement of filter units 1 resembles an accordion.

Figure 6:
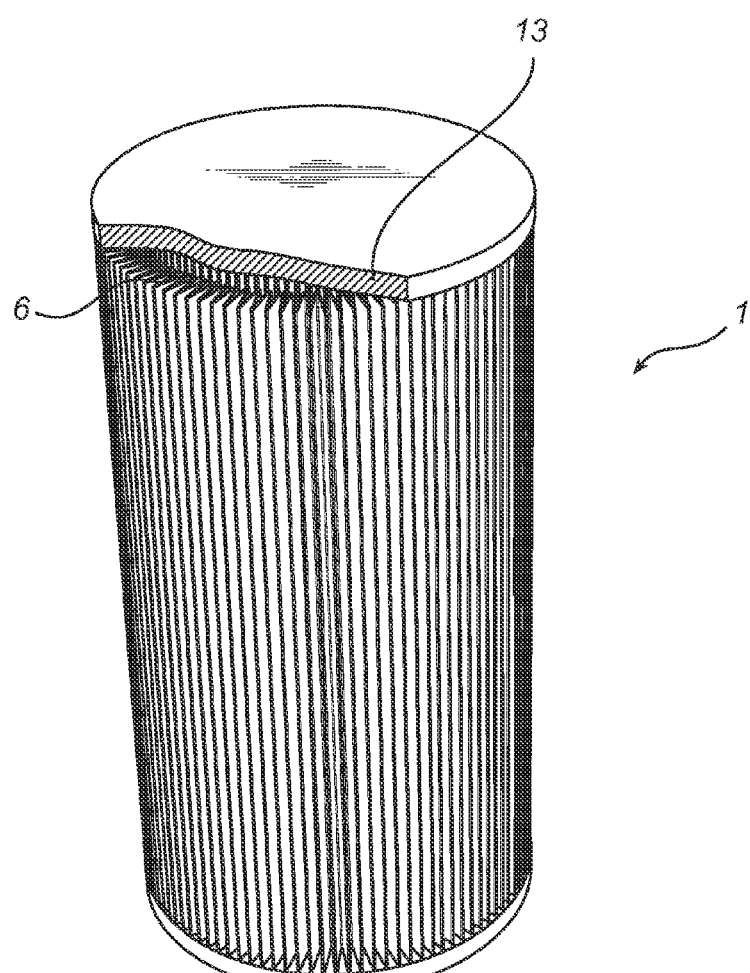
FIG. 6 is a perspective view of the filter unit according to an embodiment of the invention.

In FIG. 6, the filter unit 1 is cylinder-shaped. Thus, the pleats of the edge side 6 point radially outwards. The foamed thermoplastic material 13 is provided as a top lid and a bottom lid, such to seal and reinforce the filter unit 1 at the top and the bottom portions. The bottom lid is provided with an opening (not shown). An air flow through the filter passes radially inwards, axially inside the filter cylinder, and out through the not shown opening.

Even though the invention has been described with reference to specific exemplifying embodiments thereof, many different alterations, modifications and the like will become apparent for those skilled in the art. The described embodiments are therefore not intended to limit the scope of protection as defined in the appended claims. For example, the filter body 2 or the foamed thermoplastic material 13 may take on other shapes. For example, the filter unit 1 may be round, triangular or quadratic. Instead of a relatively flat filter unit 1 as mentioned in the previous examples, the filter unit 1 may be cylindrical or parallellepiped shaped.

Furthermore, materials for the filter suited for the removal of particles from an air or gas flow whilst still being air or gas-permeable may be any of, or the combination of, e.g. glass fiber paper, non-woven fabric, or the like.

The invention claimed is:

1. A filter unit for removing particles from an air or gas flow, comprising:
    a filter body having a front side, a rear side, and an edge side between the front side and the rear side, and
    an edge strip arranged on the edge side, which edge strip extends at least the height of the edge side and at least the length of the edge side, for providing the edge side with a mounting support,
    wherein the edge strip comprises a foamed thermoplastic material, which is molded to the edge side of the filter body such that the edge strip thereby is formed and fastened directly to the edge side of the filter body, and such that the edge side is embedded in the edge strip for providing the edge side with a sealing against air leakage,
    wherein the foamed thermoplastic material is molded to the edge side of the filter body, such that the edge strip in its cross-section is U-shaped, and
    wherein the amount of gas in the foamed thermoplastic material is 40% to 80% by volume.

2. The filter unit as claimed in claim 1, wherein the foamed thermoplastic material is molded to the edge side of the filter body, such that the edge strip forms a mounting frame for the filter body.

3. The filter unit as claimed in claim 1, wherein the filter body comprises a sheet which is pleated to form a plurality of parallel folded pleats, the foamed thermoplastic material being molded to the edge side of the filter body, which edge side is zig-zag shaped.

4. The filter unit as claimed in claim 3, wherein the foamed thermoplastic material is molded to the edge side of the filter body, which edge side is a portion of a pleat of the sheet.

5. The filter unit as claimed in claim 4, wherein the filter body is rectangular, the foamed thermoplastic material being molded to the edge sides of the filter body, such that the edge strip forms a rectangular mounting frame for the filter body.

6. The filter unit as claimed in claim 5, wherein the rectangular mounting frame in its cross-section is U-shaped.

7. The filter unit as claimed in claim 1, wherein the foamed thermoplastic material is polypropylene, polystyrene, or acrylonitrile-butadiene-styrene.

8. The filter unit as claimed in claim 7, wherein the gas comprised in the foamed thermoplastic material is air or nitrogen.

9. The filter unit as claimed in claim 1, wherein the amount of gas comprised in the foamed thermoplastic material is 50% (by volume) to 70% (by volume).

10. A filter arrangement comprising at least two filter units according to claim 1, which filter units are provided side-by-side, and the foamed thermoplastic material is molded to oppositely arranged edge sides such that the edge strips form a mounting frame shaped as a grid for the filter units.

11. A filter arrangement comprising at least two filter units according to claim 1, wherein the foamed thermoplastic material is molded to the edge sides between two adjacently provided filter units such that the two filter units are obliquely arranged at an angle.

12. The filter unit as claimed in claim 1, wherein the foamed thermoplastic material is molded both to the edge side and to a portion of the front side and the rear side.

\* \* \* \* \*